3,556,724
PHOSPHORIC ACID PROCESS
Warren Fuchs, Syosset, N.Y., and Dennis A. Wheeler, Saginaw, Mich., assignors to Baker Perkins Inc., Saginaw, Mich., a corporation of New York, and Treadwell Corporation, New York, N.Y., a corporation of New York
No Drawing. Continuation-in-part of application Ser. No. 638,743, May 16, 1967. This application May 21, 1969, Ser. No. 826,668
Int. Cl. C01b 25/18, 25/22
U.S. Cl. 23—165
3 Claims

ABSTRACT OF THE DISCLOSURE

A process for the production of high strength phosphoric acid wherein the ground rock at about −200 mesh is acidulated in a first step with mineral acid such as sulfuric acid in amounts equivalent to 10% to 50% of the total calcium present in the rock. This initial reaction generates heat and liberates gases and is controlled in temperature and time to obtain effective defluorination. The degassed rock is then passed to an endmix or second reaction stage for completing acidulation. After completing acidulation in the endmix stage the fully acidified rock is leached to recover the product phosphoric acid.

HISTORY OF THE APPLICATION

This application is a continuation-in-part of our application Ser. No. 638,743, filed May 16, 1967 now abandoned and assigned to the assignee of the subject application.

This invention relates to a novel process for the manufacture of high grade, concentrated phosphoric acid by reacting naturally occurring phosphate rock with sulfuric acid. More particularly, the invention relates to a process for the manufacture of phosphoric acid wherein the acidulation of phosphate rock and conditions therefor are carefully controlled in two stages to obtain phosphoric acid of a relatively high strength, i.e., high $P_2O_5$ content, and minimum fluorine content, and at a reaction rate substantially consistent with commercial wet process operations.

BASIS OF THE INVENTION

The production of phosphoric acid by reaction of various types of phosphate rocks with sulfuric acid and other mineral acids is well known. Typically the procedure using sulfuric acid generally comprises digesting the ground phosphate rock in sulfuric acid for a sufficient period of time to convert it to phosphoric acid and calcium sulfate, removing the calcium sulfate and other solids from the digest liquor by filtration, washing the filter cake and recycling the wash liquor containing residual phosphoric acid back to the digesting step, and obtaining a filtered digest liquor containing about 30 to 32% $P_2O_5$, which will be accompanied by small amounts of various impurities.

More recently, it has become a general desire of the industry to produce high strength phosphoric acid by direct acidulation processes and also to remove the fluorine bearing constituents contained in the phosphate rock during the process.

It is therefore an object of this invention to provide a process for the economical and direct production of high strength phosphoric acid by acidulation of phosphate rock.

It is another object of this invention to provide a process for producing high strength phosphoric acid wherein a defluorination step is included.

Another object of this invention is to provide for defluorination in a preliminary step in a manner giving a relatively concentrated fluoride gas and permitting easy fluorine recovery.

It must be appreciated that many reactions and inter-reactions can take place at the same time and therefore it is not possible to state in detail the specific chemical reactions taking place. Although the discussion herein is for the purpose of giving sufficient basis for understanding the process of the invention, it is understood that the invention is not to be limited thereto. The invention is concerned with reaction conditions and reactants, and balancing these in relation to each other and the phosphate rock to product the desired phosphoric acid product.

DETAILED DESCRIPTION OF THE INVENTION

The invention comprises the manipulation involved in two basic steps for the production of high strength phosphoric acid. They are a degassing step and an endmix step. These two basic steps are followed by a phosphoric acid recovery stage wherein the phosphoric acid is leached out of the acidulated rock in essentially conventional manner.

Phosphate rock is generally represented as an apatite having a formula $$3(CA_3(PO_4)_2) \cdot CaX_2$$

wherein X may be F, OH, Cl, ½ $CO_3$, or ½ $SiF_6$. Fluorine is a constituent in most phosphate rocks and the amount varies depending upon the area in which it occurs. Each phosphate rock, for example, is typical of its own region, but generally contains some fluorine. Typical Florida rock exemplified herein, contains 3.5 percent to 4.0 percent fluorine.

In our process the first stage of acidulation is aimed at the $$CaX_2$$

portion of the rock, to be conducted quickly so that recovery of fluorine can be carried out. Hence, we conduct a preliminary acidulation, or degasification, based on using a part of the total sulfuric acid for the process. Thus, in general terms:

$$CaX_2 + H_2SO_4 \rightarrow 2HX + CaSO_4$$

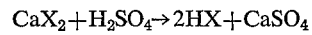

DEGASSING STAGE

When conducted with sulfuric acid:

The degassing stage according to the invention involves the reaction of controlled amounts of strong sulfuric acid, 85 percent to 100 percent strength, with ground phosphate rock under conditions to stimulate the production af gaseous fluorine products. The gaseous fluorine products which will generally include silicon tetrafluoride and some hydrogen fluoride are released in relatively concentrated form and are therefore amenable to relatively simple recovery techniques. The individual reactions which may take place between the acid and the phosphate rock are numerous and depend upon many factors such as acid concentration, acid to rock ratio, temperature, degree of mixing, time, rock particle size, impurities, etc. Specifically, in terms of the phosphate rock and sulfuric acid:

(1) $CaX_2 + H_2O \cdot SO_3 \rightarrow 2HX + CaO \cdot SO_3$
(2) $(CaO)_3P_2O_5 + 3H_2O \cdot SO_3 \rightarrow 3CaOSO_3 + (H_2O)_3P_2O_5$ In the equations given, using stoichiometric amounts of materials phosphoric acid of about 72% $P_2O_5$ content is produced. Preliminary degassing is aimed at the first equation, i.e., remove volatile HF etc. before proceeding to full reaction to release phosphoric acid.

In the degassing stage, therefore, 10–50 percent of the total acid necessary for fully acidulating rock is quite practicable. Optimum degassing results are obtained with about 30–35 percent of the acid necessary if the step is given about 10 minutes of degassing time. If more than 50 percent of the total acid requirement is used, the total mass of material becomes pasty and is not suitable for immediate transport to the endmix stage. When less than 10% of the total acid requirement is used, insufficient degassing is obtained.

According to this invention it was found that partial acidulation of the phosphate rock to appropriate degrees at controlled temperatures and mixing conditions promoted the desired reactions permitting the evolution of the fluorine-bearing compounds while at the same time liberating other gaseous constituents, such as carbon dioxide. It was found that about 60% of the fluorine-bearing compounds along with practically all of the carbon dioxide and some of the water content of the reaction mixture can be released at this stage when using acid in amounts equivalent to about ⅓ of the total calcium present in the rock. The released 60% of the fluoride in turn represents the bulk of the active or contaminating portion of the total fluoride of the original rock, the remaining 40% of the fluoride portion being relatively inactive and tending to report with leached residue after endmix acidulation. Thus, by this initial partial acidulation the gaseous products may be conveniently removed without materially affecting the overall reactions and yielding the eventual product phosphoric acid carrying less than 1.0 part fluoride per 100 parts $P_2O_5$. Equation 1, supra. Thus by this initial partial acidulation the gaseous products may be conveniently removed without materially affecting the eventual overall reactions between the phosphate portion of the rock and the acid.

In the degassing stage therefore the phosphate rock is reacted with about one-third of the total acid required for complete acidulation. The reaction is exothermic and the temperature is maintained above about 90° C. and below about 300° C., preferably in the range 100° C. to 200° C. Higher temperatures promote the production of the pyro and meta phosphates wherein the phosphoric acid is unavailable. Lower temperatures give insufficient degassing. Therefore the range of 90° C. to 300° C. is required and the range of 100° C. to 260° C. is generally preferred.

The degassing stage normally may be completed within one hour when reactive ground Florida pebble rock is acidulated with sulfuric acid.

Table II shows typical results that have been obtained from a rock having the analysis given in Table I. Table III shows a typical balance for the rock from Table I handled through degassing such as in Table II and thence through endmixing and leaching.

Degassing is an important step in the process from the economic standpoint for if carried out as specified in accordance with this invention, a substantial part of the fluoride values in the rock become easily recoverable. It is also important from the operative standpoint in the final acidulation to avoid adverse pressure conditions from gas formers otherwise still present.

In carrying out the process it must be understood that the phosphate rock is a material of variable composition, but generally expressable as follows:

$$3(Ca_3(PO_4)_2) \cdot CaX_2$$

For effective operation, therefore, it is necessary to carry out acidification so that as much of the $P_2O_5$ as possible is liberated to appear in the end of the process as phosphoric acid. This is done by converting all of the calcium to calcium sulfate. The mechanics of the process are aided by having the calcium sulfate appear in coarse crystals thereby to make it easy to filter. For preliminary degasification, the mineral acid which is selected must exihibit the potential for releasing bound X. The most useful mineral acid for degasification is sulfuric acid. In the degassing stage, of course, oleum should not be used, because it would merely create the problem of keeping volatile sulfur trioxide in the system. It is important in using the degassing procedure to avoid conditions which will convert any of the phosphate of the rock to a form in which the $P_2O_5$ becomes unavailable.

As previously indicated, for the degassing stage, sulfuric acid in strength ranging from 85–100% is useful with the amount of acid needed being based on conversion of all of the calcium to calcium sulfate. In contrast, the strength of the sulfuric acid, i.e. oleum, utilized in the final acidulation operation, i.e. in the endmix stage, should range from about 100 to 150% and preferably from about 100 to 114%; the latter figure being the equivalent of 65% oleum.

In preliminary degasification, the proportion of acid used should be based upon the analysis of the rock and generally the amount of acid for the degasification that is needed to react with about ⅓ of the calcium content of the rock.

EXAMPLE

In a typical operation employing our two-step degassing and acidulating process the following results flow for treatment of Florida rock in accordance with the invention:

TABLE I.—FLORIDA PEBBLE ROCK SPECIFICATION

| $P_2O_5$ | $F_2$ | $CO_2$ | $SO_3$ | $Fe_2O_3$ | $Al_2O_3$ | $SiO_2$ |
|---|---|---|---|---|---|---|
| 35.27 | 3.63 | 3.14 | 1.33 | 1.13 | 1.59 | 3.42 |
| CaO | as | $(CaO)_3P_2O_5$ | | | 41.73 | |
| CaO [1] | as | $CaF_2$ | | | 5.35 | |
| CaO | as | $CaOCO_2$ | | | 4.00 | |
| CaO | as | $CaOSO_3$ | | | .93 | |
| $O_2$ [2] | in | $CaF_2$ | | | −1.52 | |

[1] Moisture content: dried.
[2] Screen Analysis: 50% through 200 mesh or finer.

The rock as reported in Table I was subjected to preliminary acidulation in a well mixed reactor with 98% sulfuric acid. A heated jacketed kettle was used for this small scale test to simulate the exotherm temperature rise that would be available on large scale. The measurements are summarized as follows:

TABLE II.—DEGAS STAGE REACTION CONDITIONS
[Acid added=32% of total requirement for total conversion; Acid concentration used was 98% sulfuric; Percent loss of weight during reaction in typical results.]

| | Mix time minutes | | |
|---|---|---|---|
| | 10 | 20 | 40 |
| Percent loss, 600° F. jacket temperature | 7.95 | 8.21 | 8.46 |
| Percent loss, 345° F. jacket temperature | 6.28 | 7.05 | 7.85 |
| Typical time-temperature profile | | | |
| Time after acid addition minutes | 0 | 3 | 10 |
| Batch temperature, 600° F. jacket temperature | 225 | 405 | 465–470 |
| Batch temperature, 345° F. jacket temperature | 250 | 260 | 280–290 |

After removal of the gaseous products and transfer of the degassed rock to the endmix stage additional sulfuric acid as 20% oleum in stoichiometric amount for complete conversion of the phosphate was added to complete the reaction and produce the phosphoric acid in the end-mix stage. The total amount of sulfuric acid or oleum used at this point was sufficient to convert all calcium in the rock to $CaOSO_3$. To make the recoverable phosphoric acid of high concentration, water in the system is held at a minimum. The final acidulation data for the endmix, with the data for the overall process, are summarized in Table III:

phosphoric acid. The amount of 20% oleum added is the remainder of $SO_3$ for conversion of the phosphate rock with the minimum excess to complete the reaction.

As the degassing stage, the reaction is exothermic with the temperature during the endmix stage to be maintained below 350° C. to avoid excessive corrosion but above 100° C. to assist the agglomeration and crystal growth of the calcium sulfate.

TABLE III.—ROCK BALANCE

|  | Florida pebble, kg.[1] | Degassed rock, kg. | Endmix rock, kg. | Leached residue, kg.[2] | Leached acid, kg. |
|---|---|---|---|---|---|
| $P_2O_5$ | 35.27 | 35.27 | 35.27 | | 35.27 |
| $F_2$ | 3.63 | 1.46 | 1.46 | 1.46 | |
| $CO_2$ | 3.14 | | | | |
| $SO_3$ | 1.33 | 24.80 | 74.40 | 74.40 | |
| $Fe_2O_2$ | 1.13 | 1.13 | 1.13 | 1.13 | |
| $Al_2O_3$ | 1.59 | 1.59 | 1.59 | 1.59 | |
| $SiO_2$ | 3.42 | 1.70 | 1.70 | 1.70 | |
| CaO total | 52.01 | 52.01 | 52.01 | 52.01 | |
| $O^2$ in $F_2$ | −1.52 | −0.61 | −0.61 | −0.61 | |
| Total Rock | 100. | 117.35 | 166.95 | 131.68 | |
| Rock $H_2O$ | 0 | 1.09 | 12.59 | | |
| Acid $SO_3$ | | 23.47 | | | |
| Oleum $SO_3$ | | | 49.60 | | |
| Acid $H_2O$ | | 5.87 | | | |
| Oleum $H_2O$ | | | 11.50 | | |
| Degas $SiF_4$ | | 2.98 | | | |
| Degas $CO_2$ | | 3.14 | | | |
| Degas $H_2O$ | | 4.78 | | | |
| Acid $P_2O_5$ | | | | 35.27 | 35.27 |

[1] Same material as in Table I.
[2] Conventional leach.

In Table III above, data are summarized for the whole process showing a material balance on 100 kilograms of rock, with an analysis of the starting phosphate rock. The analysis of the rock is a repetition of information in Table I.

In the second column, the composition of the degassed rock is shown and from the analysis it will be evident that a complete removal of the carbon dioxide has been effected and that about two thirds of the bound fluorine has been removed. This removal of fluorine to the extent of about two thirds must be balanced with the economics of the processing and heating and indirectly to the losses. As it is designed to remove fluorine from the rock, theoretically, it is possible to remove one hundred percent of the fluorine. However, this may be accompanied by additional losses in the form of conversion of $P_2O_5$ to unavailable form.

In the second column the line indicating $SO_3$ addition as acid reflects the amount of $SO_3$ added as concentrated sulfuric acid, 98% acid. In the stage where removal of fluorine is desired, oleum is not preferred, because its use results in loss of sulfur trioxide unless elaborate precautions are taken. Generally a small amount of water in the system is likely to be helpful and, for this reason, the acidulation is carried out with 98% sulfuric acid, such acid carrying 80% combined $SO_3$ plus 2% free water plus 18% combined water. This is reflected in the column wherein it is shown that about 32 percent of the total acid required in terms of $SO_3$, appears as 23.47 parts $SO_3$ added together with 5.87 parts $H_2O$.

This degassing acidulation is conducted in a hooded vessel equipped for intensive mixing of material, adequately resistant to the acids used and provided with suitable piping for removal and collection of the generated gases.

PHOSPHORIC ACID ENDMIX STAGE

In the endmix stage wherein it is important to maintain a filterable crystalline form of calcium sulfate balanced against correct addition of sulfuric acid in stoichiometric amount to convert the rock to phosphoric acid, we have indicated in the example the addition of 49.6 parts of $SO_3$ added as 20% oleum. In this stage it is advantageous to use oleum (100–150% sulfuric acid equivalent) in order to develop the highest concentration of product The endmix is carried out in an enclosed reciprocating and rotating interrupted screw type mixing machine for example such as that described in U.S. Pat. 2,932,557. An enclosed intensive mixer of such type is essential for this stage, to assure intimate contact of the reactants as necessary for the desired high recover of the $P_2O_5$, and to avoid $SO_3$ and $P_2O_5$ losses by evaporation.

PHOSPHORIC ACID RECOVERY STAGE

The material leaving the intensive mixer is typically a granular paste made up of phosphoric acid and calcium sulfate with unreacted ingredients such as silica from the original rock.

The phosphoric acid may be recovered by centrifugal filtration equipment. Using conventional centrifugal wash practice phosphoric acid is produced directly at any strength containing up to more than 54% $P_2O_5$. Other suitable techniques for the acid recovery are found described in a publication by TVA of their 5th Demonstration of Oct. 6–7, 1964 of New Developments in Fertilizer Technology.

What is claimed is:
1. A process for the production of high strength phosphoric acid having a low fluorine content comprising the stages of:
 (1) initially partially acidulating ground phosphate rock at temperatures of between about 90–300° C. with sulfuric acid of 85–100% concentration in an amount equivalent to about 10 to 50% of the total calcium present in the rock for a period of time sufficient to permit fluorine bearing products and other gaseous products to evolve; and
 (2) completing acidulation at temperatures of between about 100–350° C. with fuming sulfuric acid of 100–150% concentration in an amount sufficient to substantially complete the conversion of the phosphate content of the rock to phosphoric acid; and subsequently recovering the phosphoric acid.
2. A process for the production of high strength phosphoric acid having a low fluorine content comprising the stages of:
 (1) initially partially acidulating ground phosphate rock at temperatures of between about 200° C. and 100° C. with sulfuric acid of 85–100% concentration in an amount equivalent to about ⅓ of the total calcium present in the rock for a period of time sufficient to permit fluorine bearing products and other gaseous products to evolve; and (2) completing acidulation at temperatures of between 100–350° C. with fuming sulfuric acid of 100–114% concentration in an amount sufficient to substantially complete the conversion of the phosphate content of the rock to phosphoric acid, and subsequently recovering the phosphoric acid.

3. A process in accordance with claim 1, wherein preliminary acidulation is carried out with about ⅓ of the total sulfuric acid requirement and for a period of about 10 minutes.

References Cited

UNITED STATES PATENTS

| 3,161,467 | 12/1964 | Hignett et al. | 23—165 |
| 3,170,784 | 2/1965 | Hand | 71—40 |
| 3,420,628 | 1/1969 | Robinson | 23—165 |

FOREIGN PATENTS

| 1,083,792 | 6/1960 | Germany | 23—165 |

OSCAR R. VERTIZ, Primary Examiner

G. A. HELLER, Assistant Examiner